United States Patent
Mallick et al.

(10) Patent No.: US 12,408,159 B2
(45) Date of Patent: Sep. 2, 2025

(54) SIDELINK COMMUNICATION USING MULTIPLE PROTOCOL STACKS

(71) Applicant: LENOVO (BEIJING) LIMITED, Beijing (CN)

(72) Inventors: Prateek Basu Mallick, Dreieich (DE); Joachim Loehr, Wiesbaden (DE); Lianhai Wu, Beijing (CN); Xiaodong Yu, Beijing (CN); Jing Han, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 551 days.

(21) Appl. No.: 17/420,838

(22) PCT Filed: Jan. 11, 2019

(86) PCT No.: PCT/CN2019/071384
§ 371 (c)(1),
(2) Date: Jul. 6, 2021

(87) PCT Pub. No.: WO2020/143033
PCT Pub. Date: Jul. 16, 2020

(65) Prior Publication Data
US 2022/0086855 A1    Mar. 17, 2022

(51) Int. Cl.
*H04W 72/12*    (2023.01)
*H04W 28/02*    (2009.01)
(Continued)

(52) U.S. Cl.
CPC ... *H04W 72/1215* (2013.01); *H04W 28/0278* (2013.01); *H04W 72/52* (2023.01); *H04W 88/06* (2013.01)

(58) Field of Classification Search
None
See application file for complete search history.

(56) References Cited

U.S. PATENT DOCUMENTS

| | | | |
|---|---|---|---|
| 2011/0051656 A1* | 3/2011 | Hethuin | H04B 7/1555 370/315 |
| 2015/0029913 A1 | 1/2015 | Zhou et al. | |

(Continued)

FOREIGN PATENT DOCUMENTS

| | | |
|---|---|---|
| CN | 107592984 A | 1/2018 |
| CN | 107852765 A | 3/2018 |

(Continued)

OTHER PUBLICATIONS

Internation Searching Authority, "Written Opinion of the International Searching Authority," PCT/CN2019/071384, May 24, 2019, pp. 1-4.

*Primary Examiner* — Jenkey Van
(74) *Attorney, Agent, or Firm* — Kunzler Bean & Adamson

(57) ABSTRACT

Apparatuses, methods, and systems are disclosed for sidelink communication using multiple protocol stacks. One method (800) includes assigning (802) a first protocol stack of a device to network communications. The method (800) includes assigning (804) a second protocol stack of the device to sidelink communications. The method (800) includes generating (806), at the second protocol stack, first information based on arrival of data in a sidelink logical channel. The method (800) includes transmitting (808) the first information from the second protocol stack to a network device via the first protocol stack.

16 Claims, 8 Drawing Sheets

(51) Int. Cl.
    *H04W 72/52*    (2023.01)
    *H04W 88/06*    (2009.01)

(56) References Cited

U.S. PATENT DOCUMENTS

| | | | |
|---|---|---|---|
| 2017/0272384 A1 | 9/2017 | Lee et al. | |
| 2017/0353819 A1* | 12/2017 | Yin | H04L 47/30 |
| 2018/0213379 A1 | 7/2018 | Xiong et al. | |
| 2019/0029061 A1* | 1/2019 | Feng | H04W 72/23 |
| 2019/0166640 A1* | 5/2019 | Wei | H04W 72/52 |
| 2019/0274121 A1* | 9/2019 | Wu | H04L 5/0092 |
| 2021/0410162 A1* | 12/2021 | Kang | H04W 72/23 |
| 2022/0022199 A1* | 1/2022 | Zhao | H04W 72/23 |

FOREIGN PATENT DOCUMENTS

| | | | | |
|---|---|---|---|---|
| EP | 3500046 A1 * | 6/2019 | | H04W 40/22 |
| WO | 2017099833 A1 | 6/2017 | | |

* cited by examiner

SIDELINK COMMUNICATION USING MULTIPLE PROTOCOL STACKS

FIELD

The subject matter disclosed herein relates generally to wireless communications and more particularly relates to sidelink communication using multiple protocol stacks.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Backhaul ("BH"), Broadcast Multicast ("BM"), Buffer Occupancy ("BO"), Base Station ("BS"), Buffer Status Report ("BSR"), Bandwidth Part ("BWP"), Component Carrier ("CC"), Control Element ("CE"), Coordinated Multipoint ("CoMP"), Categories of Requirements ("CoR"), Control Plane ("CP"), CSI-RS Resource Indicator ("CRI"), Cell RNTI ("C-RNTI"), Channel State Information ("CSI"), Channel Quality Indicator ("CQI"), Central Unit ("CU"), Codeword ("CW"), Downlink ("DL"), Demodulation Reference Signal ("DMRS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), Hybrid Automatic Repeat Request ("HARQ"), Integrated Access Backhaul ("IAB"), Identity or Identifier or Identification ("ID"), Interference Measurement ("IM"), International Mobile Subscriber Identity ("IMSI"), Internet-of-Things ("IoT"), Internet Protocol ("IP"), Joint Transmission ("JT"), Level 1 ("L1"), Logical Channel ("LCH"), Logical Channel Group ("LCG"), Logical Channel ID ("LCID"), Logical Channel Prioritization ("LCP"), Long Term Evolution ("LTE"), Levels of Automation ("LoA"), Medium Access Control ("MAC"), Modulation Coding Scheme ("MCS"), Multiple Input Multiple Output ("MIMO"), Mobile-Termination ("MT"), Machine Type Communication ("MTC"), Multi-User MIMO ("MU-MIMO"), Negative-Acknowledgment ("NACK") or ("NAK"), Next Generation ("NG"), Next Generation Node B ("gNB"), New Radio ("NR"), Non-Zero Power ("NZP"), Orthogonal Frequency Division Multiplexing ("OFDM"), Peak-to-Average Power Ratio ("PAPR"), Physical Broadcast Channel ("PBCH"), Physical Downlink Shared Channel ("PDSCH"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), Packet Switched ("PS"), Physical Sidelink Control Channel ("PSCCH"), Physical Sidelink Shared Channel ("PSSCH"), Quasi Co-Located ("QCL"), Quality of Service ("QoS"), Random Access Channel ("RACH"), Radio Access Network ("RAN"), Radio Access Technology ("RAT"), Resource Element ("RE"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Reference Signal ("RS"), Reference Signal Received Power ("RSRP"), Reference Signal Received Quality ("RSRQ"), Receive ("RX"), Secondary Cell ("SCell"), Sub Carrier Spacing ("SCS"), Service Data Unit ("SDU"), Subscriber Identity Module ("SIM"), Signal-to-Interference and Noise Ratio ("SINR"), Sidelink ("SL"), Sequence Number ("SN"), Scheduling Request ("SR"), Synchronization Signal ("SS"), SS/PBCH Block ("SSB"), Time Division Duplex ("TDD"), Temporary Mobile Subscriber Identity ("TMSI"), Transmission Reception Point ("TRP"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Vehicle RNTI ("V-RNTI"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, sidelink communications may be used. In such networks, sidelink communications may use one radio access technology and network communications may use another radio access technology.

BRIEF SUMMARY

Methods for sidelink communication using multiple protocol stacks are disclosed. Apparatuses and systems also perform the functions of the apparatus. In one embodiment, the method includes assigning a first protocol stack of a device to network communications. In certain embodiments, the method includes assigning a second protocol stack of the device to sidelink communications. In various embodiments, the method includes generating, at the second protocol stack, first information based on arrival of data in a sidelink logical channel. In some embodiments, the method includes transmitting the first information from the second protocol stack to a network device via the first protocol stack.

An apparatus for sidelink communication using multiple protocol stacks, in one embodiment, includes a processor that: assigns a first protocol stack of the apparatus to network communications; assigns a second protocol stack of the apparatus to sidelink communications; and generates, at the second protocol stack, first information based on arrival of data in a sidelink logical channel. In various embodiments, the apparatus includes a transmitter that transmits the first information from the second protocol stack to a network device via the first protocol stack.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
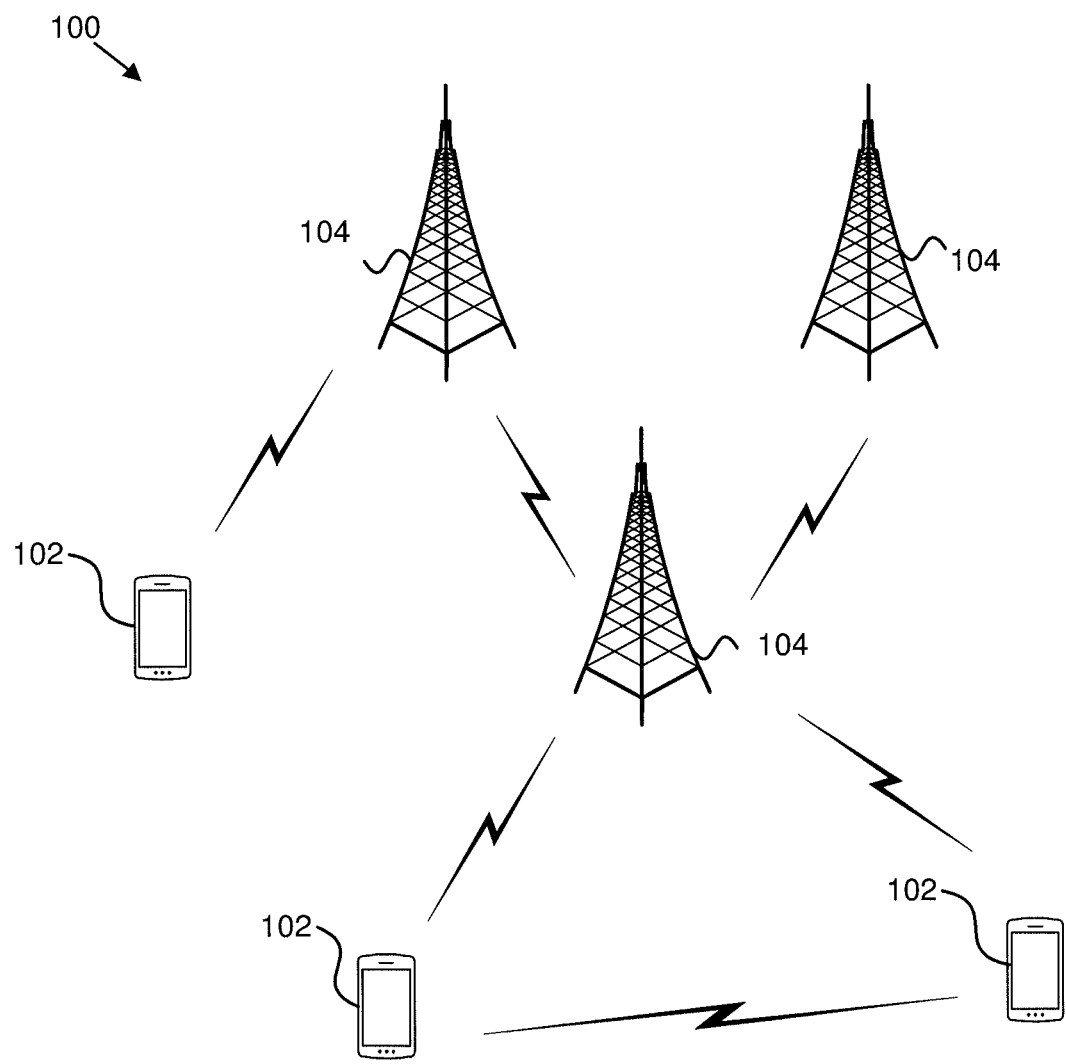
FIG. 1 is a schematic block diagram illustrating one embodiment of a wireless communication system for sidelink communication using multiple protocol stacks.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for sidelink communication using multiple protocol stacks. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may assign a first protocol stack of the remote unit 102 to network communications. In certain embodiments, the remote unit 102 may assign a second protocol stack of the remote unit 102 to sidelink communications. In various embodiments, the remote unit 102 may generate, at the second protocol stack, first information based on arrival of data in a sidelink logical channel. In some embodiments, the remote unit 102 may transmit the first information from the second protocol stack to a network device (e.g., the network unit 104) via the first protocol stack. Accordingly, a remote unit 102 may be used for sidelink communication using multiple protocol stacks.

In some embodiments, a network unit 104 may transmit information to a first remote unit 102 that is used by the first remote unit 102 for accomplishing communication to a second remote unit 102. The communication between the network unit 104 and the first remote unit 102 uses a first RAT and the communication between the first remote unit 102 and the second remote unit 102 uses a second RAT.

Figure 2:
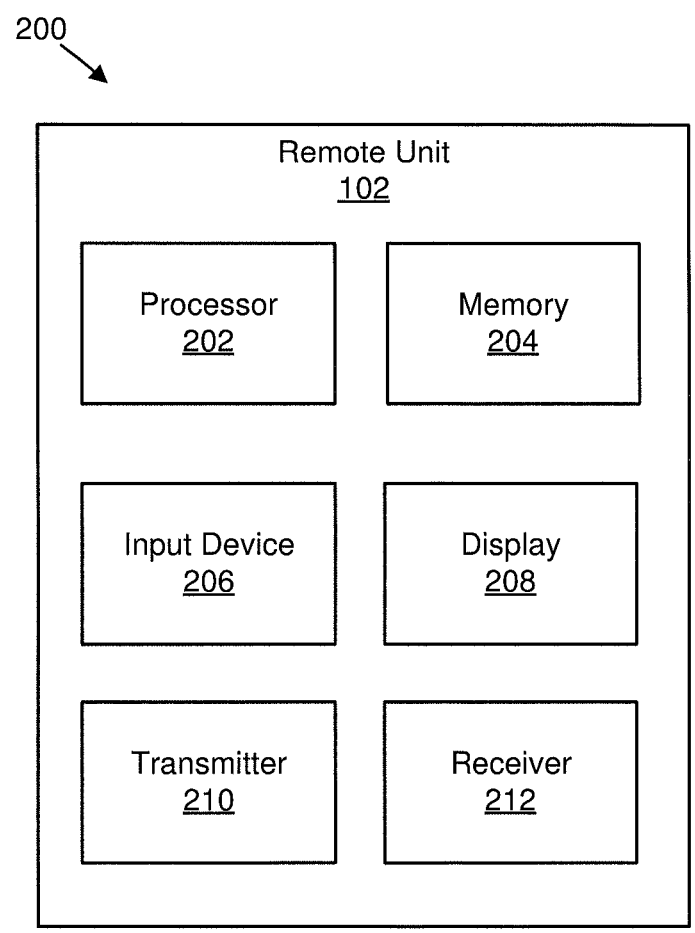
FIG. 2 is a schematic block diagram illustrating one embodiment of an apparatus that may be used for sidelink communication using multiple protocol stacks.

FIG. 2 depicts one embodiment of an apparatus 200 that may be used for sidelink communication using multiple protocol stacks. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 assigns a first protocol stack of the remote unit 102 to network communications; assigns a second protocol stack of the remote unit 102 to sidelink communications; and generates, at the second protocol stack, first information based on arrival of data in a sidelink logical channel. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the transmitter 210 transmits the first information from the second protocol stack to a network device via the first protocol stack.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
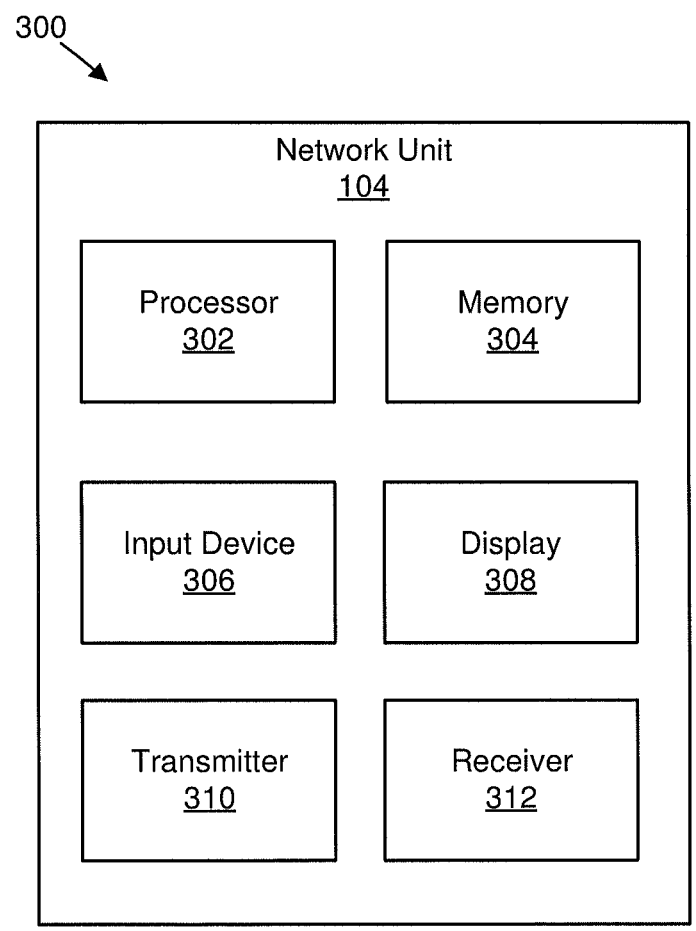
FIG. 3 is a schematic block diagram illustrating one embodiment of an apparatus that may be used for sidelink communication using multiple protocol stacks.

FIG. 3 depicts one embodiment of an apparatus 300 that may be used for sidelink communication using multiple protocol stacks. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
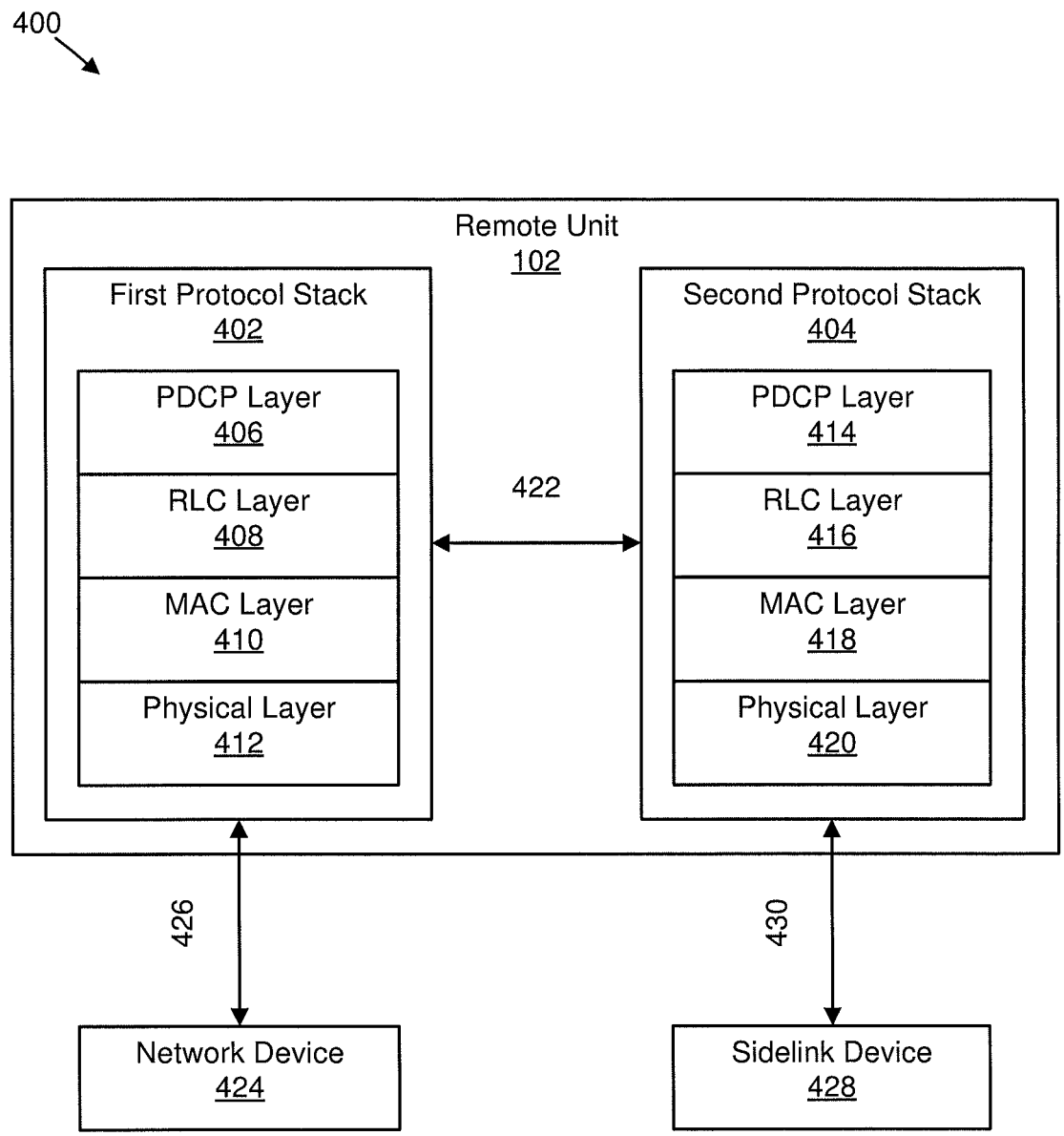
FIG. 4 is a schematic block diagram illustrating one embodiment of a system for sidelink communication using multiple protocol stacks.

FIG. 4 is a schematic block diagram illustrating one embodiment of a system 400 for sidelink communication using multiple protocol stacks. The system 400 includes one embodiment of the remote unit 102 as described herein. Moreover, the remote unit 102 includes a first protocol stack 402 (e.g., a Uu protocol stack—i.e., a protocol stack for communications between a UE and an eNB and/or gNB) and a second protocol stack 404 (e.g., a sidelink protocol stack). The first protocol stack 402 may be used for first RAT communications (e.g., network communications) and the second protocol stack 404 may be used for second RAT communications (e.g., sidelink communications). The first RAT and the second RAT may be different from one another.

The first protocol stack 402 includes a PDCP layer 406, an RLC layer 408, a MAC layer 410, and a physical layer 412 all corresponding to the first RAT communications. Further, the second protocol stack 404 includes a PDCP layer 414, an RLC layer 416, a MAC layer 418, and a physical layer 420 all corresponding to the second RAT communications.

As illustrated, the first protocol stack 402 may transmit and/or receive communications 422 with the second protocol stack 404. The system 400 includes a network device 424 (e.g., network unit 104). The first protocol stack 402 may transmit and/or receive communications 426 with the network device 424 using the first RAT via a Uu interface (i.e., a communication interface between a UE and an eNB and/or a gNB, such as an LTE Uu interface or an NR Uu interface). Further, the system 400 includes a sidelink device 428 (e.g., remote unit 102). The second protocol stack 404 may transmit and/or receive communications 430 with the sidelink device 428 using the second RAT. Thus, the remote unit 102 (e.g., a UE) may request sidelink resources on the first RAT (e.g., serving RAT) for V2X transmissions on the second RAT (e.g., a non-serving RAT) and enable the network device 424 (e.g., a serving RAN) to control resource grant to the remote unit 102 using the first RAT. It should be noted that sidelink communication described herein may be LTE sidelink communication or NR sidelink communication.

In one embodiment, a remote unit 102 interested in performing sidelink communication on a second RAT may inform the network device 424 about its interest in performing sidelink communication. The network device 424 may then in turn configure the remote unit 102 with necessary configuration information such as: LCG IDs specific to sidelink logical channels of the second RAT, a RNTI specific to accomplish communication (e.g., receiving a sidelink second RAT specific DCI) with the second protocol stack 404, etc.

In one embodiment, a BSR may be triggered in the MAC layer 418 of the second protocol stack 404. The BSR may be reported from the MAC layer 418 of the second protocol stack 404 to the network device 424 via the MAC layer 410 of the first protocol stack 402. In certain embodiments, a SL grant may be indicated from the physical layer 412 of the first protocol stack 402 to the physical layer 420 of the second protocol stack 404. The physical layer 420 of the second protocol stack 404 may indicate the SL grant to the MAC layer 418 of the second protocol stack 404. In various embodiments, a SL grant may be indicated directly from the physical layer 412 of the first protocol stack 402 to the MAC layer 418 of the second protocol stack 404. In some embodiments, the second protocol stack 404 may be activated in the remote unit 102 in response to data from an application using sidelink transmission over the second RAT arriving at or above layer 2 of the first protocol stack 402 (e.g., at or above the PDCP layer 414, the RLC layer 416, or the MAC layer 418). The application may send an indication from an upper layer including V2X application and control layers and the NAS protocol based on the application's QoS requirements and the indication may indicate that the application is using sidelink transmission on a second RAT.

In certain embodiments, the second protocol stack 404 may be configured with triggers for sending a BSR. The triggers for sending the BSR may be monitored by the MAC layer 418 of the second protocol stack 404. In various embodiments, the triggers for sending a BSR may include: data from a SL V2X logical channel becoming available for transmission—this may be regardless of priority rules for reporting a regular BSR; a time based trigger (e.g., periodically causing a trigger to occur if configured by the network. To enable this, the remote unit 102 may inform the network device 424 using RRC signaling that it may need to perform sidelink transmission on the second RAT and in response the network device 424 may configure the periodicity of BSR reporting and may allocate resources to the remote unit 102 that include resources for sending scheduling requests); adding and/or removing a bearer and/or a destination (e.g., the bearer and/or the destination may use sidelink V2X transmission in the second RAT); adding and/or removing a bearer for a cast-type (e.g., unicast, multicast, groupcast)—the bearer may use sidelink V2X transmission in the second RAT; and/or a change in vehicle location (e.g., vehicle moves into a different geographical zone, based on GPS coordinates and/or similar location change methods).

In various embodiments, the remote unit 102 may form a MAC CE for BSR reporting. In certain embodiments, a new MAC CE may be used to only report BO of SL logical channels terminating in the MAC layer 418 of the second protocol stack 404. In some embodiments, a reserved logical channel ID may correspond to the new MAC CE. In one embodiment, the MAC CE format may be like the MAC CE format illustrated in FIG. 6.1.3.1a of 3GPP TS 36321430.

In certain embodiments, multiple BSRs from one or more logical channels may be pending in the MAC layer 410 of the first protocol stack 402. The network device 424 may need to know which of the BSRs corresponds to UL data and which of the BSRs corresponds to SL data so that the network device 424 can provide appropriate UL and SL grants. Accordingly, information regarding each BSR is provided to the network device 424 to indicate whether a corresponding BSR is for BO of UL data, BO of sidelink V2X on NR, or BO of sidelink V2X on LTE.

In various embodiments, different MAC CEs may be used to transmit information regarding each BSR provided to the network device 424. In such embodiments, a unique MAC CE may indicate whether a corresponding BSR is for BO of UL data, BO of sidelink V2X on NR, or BO of sidelink V2X on LTE (e.g., 3 different MAC CEs).

In some embodiments, different LCG IDs may be used to transmit information regarding each BSR provided to the network device 424. In such embodiments, separate LCGs may be used indicate whether a corresponding BSR is for BO of UL data, BO of sidelink V2X on NR, or BO of sidelink V2X on LTE (e.g., 3 different LCG IDs). For example, a first LCG ID may carry BO of sidelink V2X on NR, a second LCG ID may carry BO of sidelink V2X on LTE, and a third LCG ID may carry BO of UL data. In some embodiments, a total number of LCGs reported to be 4 or greater in LTE and/or 8 or greater in NR. The total number of LCGs may be greater than 4 in LTE and 8 in NR to accommodate multiple logical channels of sidelink V2X on NR and multiple logical channels on sidelink V2X on LTE. A mapping between an LCG ID and a type of data reported may be provided to the remote unit 102 by specification or network configuration (e.g., RRC signaling). In certain embodiments, a mapping between logical channels and LCG IDs may be provided to the remote unit 102 by specification or network configuration.

In various embodiments, a combination of different MAC CEs and LCG IDs may be used to transmit information regarding each BSR provided to the network device 424. In such embodiments, a unique MAC CE may indicate whether a corresponding BSR is for UL or SL, and a LCG ID may indicate whether a SL BSR is for BO of sidelink V2X on NR or BO of sidelink V2X on LTE. A mapping between MAC CEs, LCG IDs, types of data, and/or logical channels may be provided to the remote unit 102 by specification or network configuration.

In some embodiments, the second protocol stack 404 may send one or more of the following to the first protocol stack 402: an indication that data is available for transmission (e.g., BSR has been triggered in the second RAT); a BO when a BSR has been triggered (e.g., 400 bytes for LCG ID x and 1000 bytes for LCG ID y); and a full BSR report that is only for a sidelink logical channel in the second RAT. Upon receiving one or more of the indication and the BO from the second protocol stack 404, the first protocol stack 402 may prepare a combined BSR report. The combined BSR report may include BOs from the first protocol stack 402 and the BOs from the second protocol stack 404. The first protocol stack 402 may query the second protocol stack 404 before sending the combined BSR report to the network device 424 to ensure that the latest BOs are reported. If the first protocol stack 402 only receives the full BSR report (e.g., sidelink BSR report) from the second protocol stack 404, the first protocol stack 402 may forward the full BSR report to the network device 424. In some embodiments, the first protocol stack 402 may send the full BSR report from the second protocol stack 404 together with a BSR report from the first protocol stack 402.

Figure 5:
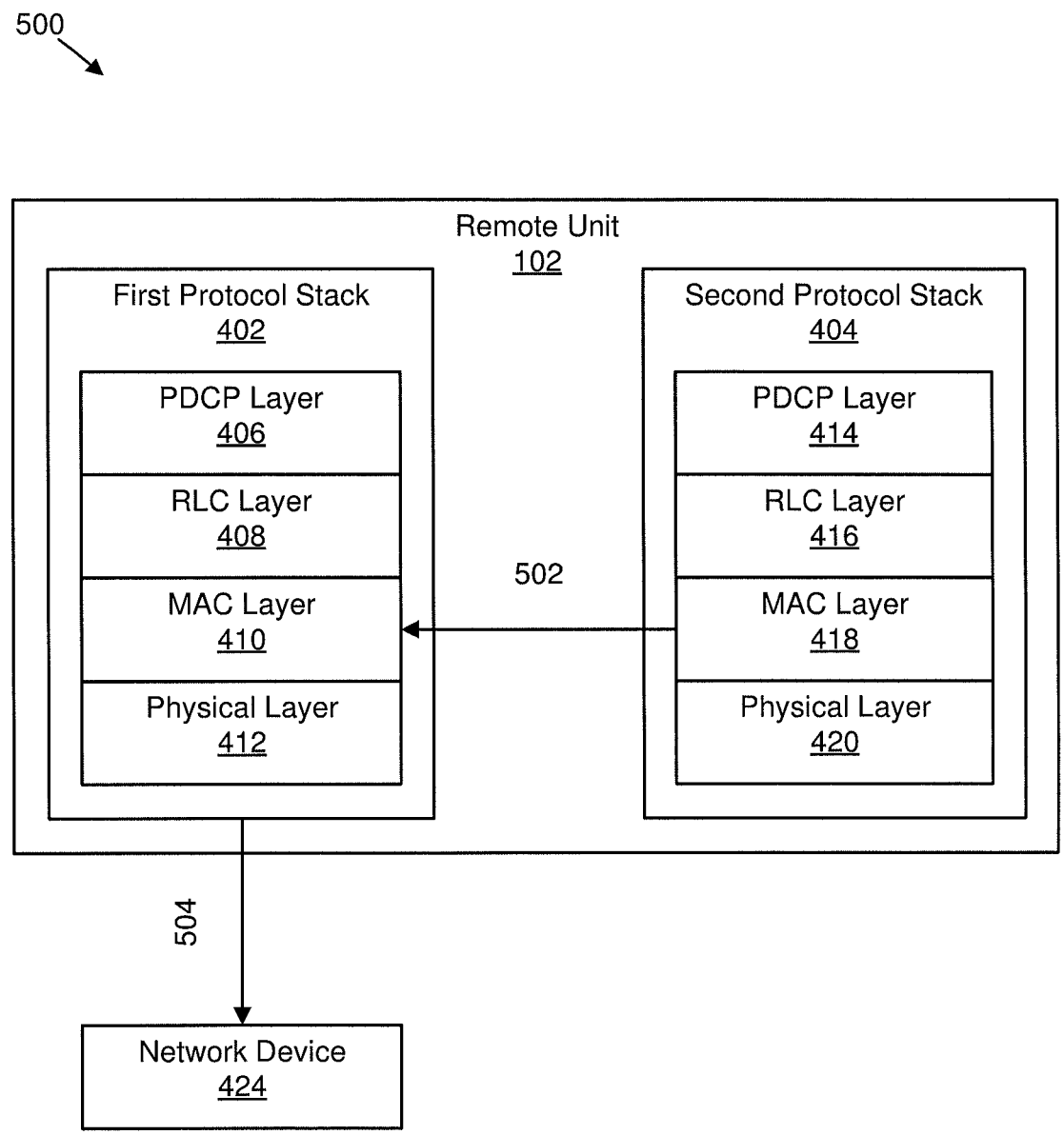
FIG. 5 is a schematic block diagram illustrating one embodiment of a system for network communication using multiple protocol stacks.

FIG. 5 is a schematic block diagram illustrating one embodiment of a system 500 for network communication using multiple protocol stacks. The system 500 includes one embodiment of the remote unit 102 as described herein. Moreover, the remote unit 102 includes the first protocol stack 402 and the second protocol stack 404. The first protocol stack 402 and the second protocol stack 404 are described in relation to FIG. 4. The system 500 also includes the network device 424 that is also described in relation to FIG. 4.

In some embodiments, the remote unit 102 may need to report a BSR to the network device 424. In certain embodiments, the MAC layer 418 of the second protocol stack 404 may report via communications 502 one of the following to the MAC layer 410 of the first protocol stack 402: an indication that new data is available for transmission (e.g., an indication that a SL BSR for the second RAT has triggered); or SL BOs (e.g., in bytes) of one or more LCGs and/or destination IDs. In embodiments in which the indication that new data is available for transmission is transmitted, the MAC layer 410 of the first protocol stack 402 may later request exact BOs from the MAC layer 418 of the second protocol stack 404 after an UL grant is received. In embodiments in which SL BOs are transmitted, the MAC layer 418 of the second protocol stack 404 may periodically update information corresponding to the SL BOs or the MAC layer 410 of the first protocol stack 402 may request the latest SL BO values after an UL grant is received and/or LCP is completed. In certain embodiments, the communications 502 may include one or more actual BOs, SL LCG IDs corresponding to BOs, one or more destination IDs, and/or a cast-type (e.g., unicast, multicast, groupcast). In various embodiments, the MAC layer 410 of the first protocol stack 402 may report via communications 504 BOs and/or BSRs to the network device 424.

In some embodiments, a SR may be configured by the network device 424 and may be transmitted by the remote unit 102. In certain embodiments, the SR may be configured so that the SR configuration may be used by one or more V2X logical channels. In various embodiments, the SR may be configured so that there are separate SR configurations for LTE sidelink V2X, NR sidelink V2X. In some embodiments, the SR may be configured so that there are separate SR configurations for specific bearers belonging to V2X logical channels. In certain embodiments, the SR may be configured so that there is: an SR configuration per UE (e.g., remote unit 102); an SR configuration per SL RAT (e.g., LTE V2X BSR, NR V2X BSR); an SR configuration per destination ID (e.g., the destination ID may indicate cast information such as unicast, groupcast, and/or broadcast); an SR configuration per SL LCG; and/or an SR configuration per LCH.

In some embodiments, an SR may be configured so there is a separate SR configuration per UE and that only configured V2X logical channels can use the SR configuration. As may be appreciated, a SR may be triggered by the MAC layer 418 of the second protocol stack 404 for logical channels terminating in the MAC layer 418. The MAC layer 418 of the second protocol stack 404 may indicate the trigger to the MAC layer 410 of the first protocol stack 402. Moreover, the MAC layer 410 of the first protocol stack 402 may instruct the physical layer 412 of the first protocol stack 402 to use specific SR resources for SR transmission.

In certain embodiments, if no SR is configured for SL data to request an UL grant or if a configured maximum number of SR transmissions are made without receiving a SL grant (e.g., specific DCI with SL grant), then the MAC layer 410 of the first protocol stack 402 may trigger and/or run a RACH procedure on behalf of the MAC layer 418 of the second protocol stack 404. In such embodiments, MsgA (e.g., in 2-step RACH) or Msg3 (e.g., in 4-step RACH) may include the SL BSR (e.g., BOs from SL logical channels from the second RAT) transmitted to the network device 424.

In various embodiments, the remote unit 102 may attempt to receive SL grants for sidelink V2X communication using an RNTI configured for SL grants of the second RAT. In some embodiments, the remote unit 102 may attempt to receive SL grants for sidelink V2X communication using a new DCI format. In certain embodiments, the network device 424 may provide UL grants and/or SL grants directly if it can identify (e.g., based on an SR configuration) that data for a sidelink V2X channel is available for transmission. As used herein, the network device 424 may refer to a single network device, or multiple network devices (e.g., an eNB, a gNB, a RAN, a network, etc.).

Figure 6:
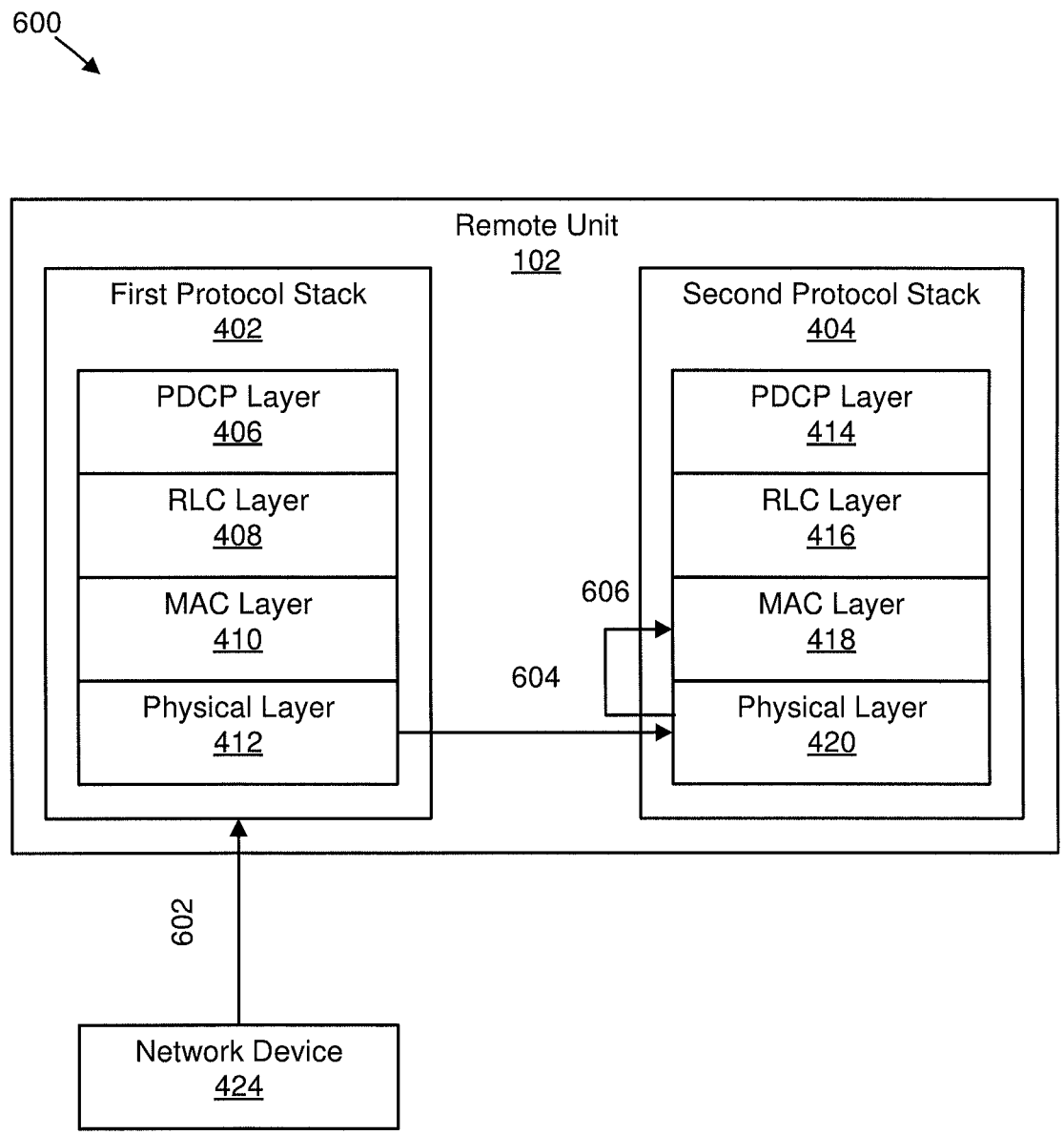
FIG. 6 is a schematic block diagram illustrating another embodiment of a system for network communication using multiple protocol stacks.

FIG. 6 is a schematic block diagram illustrating another embodiment of a system 600 for network communication using multiple protocol stacks. The system 600 includes one embodiment of the remote unit 102 as described herein. Moreover, the remote unit 102 includes the first protocol stack 402 and the second protocol stack 404. The first protocol stack 402 and the second protocol stack 404 are described in relation to FIG. 4. The system 600 also includes the network device 424 that is also described in relation to FIG. 4.

In some embodiments, in response to a SL grant being received (e.g., either dynamically or semi-persistently) via communications 602 from the network device 424 to the first protocol stack 402, the physical layer 412 of the first protocol stack 402 may convey the SL grant to the physical layer 420 of the second protocol stack 404 via communications 604. In such embodiments, the physical layer 420 of the second protocol stack 404 may convey the SL grant to the MAC layer 418 of the second protocol stack 404 via communications 606.

Figure 7:
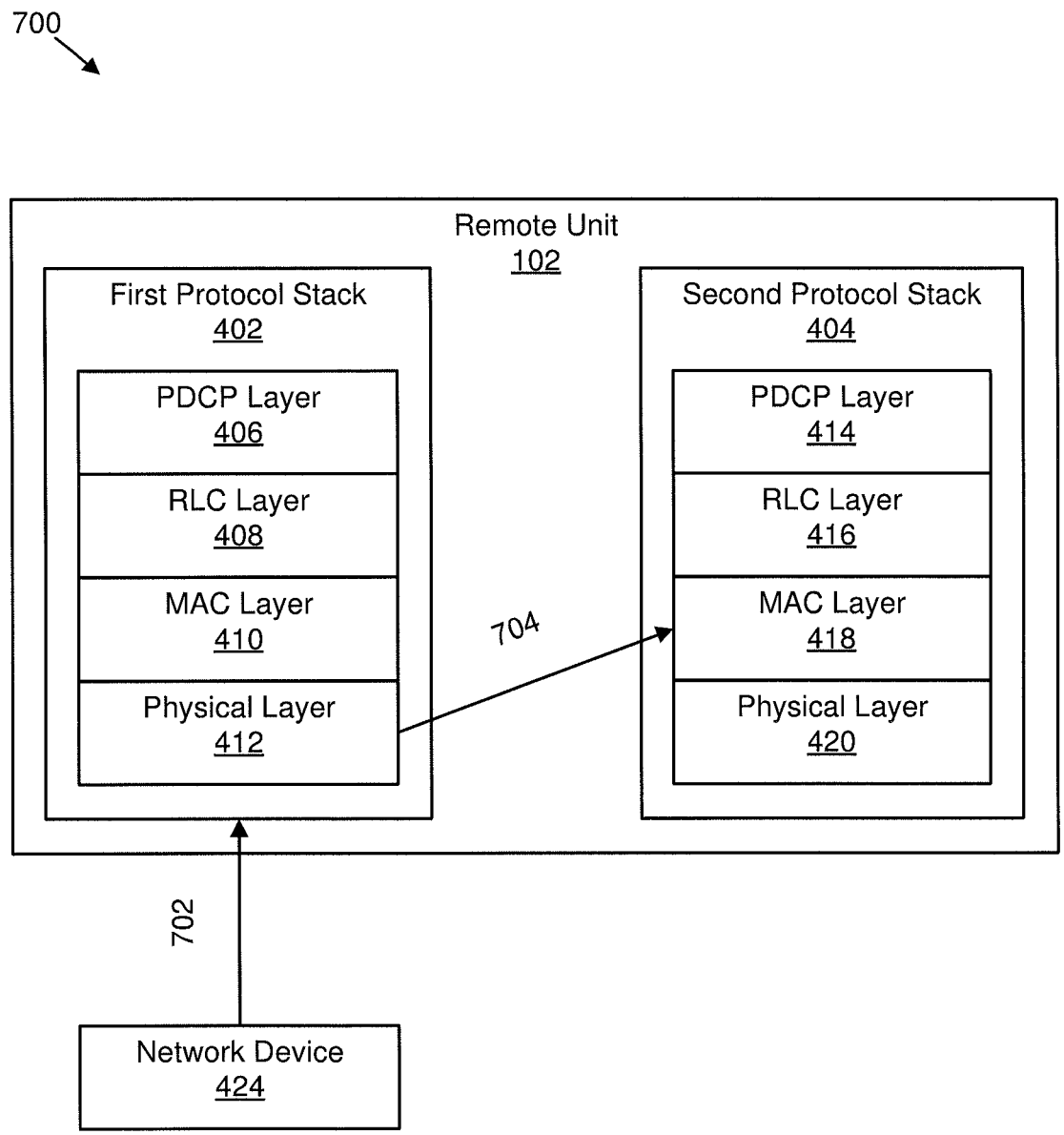
FIG. 7 is a schematic block diagram illustrating a further embodiment of a system for network communication using multiple protocol stacks.

FIG. 7 is a schematic block diagram illustrating a further embodiment of a system 700 for network communication using multiple protocol stacks. The system 700 includes one embodiment of the remote unit 102 as described herein. Moreover, the remote unit 102 includes the first protocol stack 402 and the second protocol stack 404. The first protocol stack 402 and the second protocol stack 404 are described in relation to FIG. 4. The system 700 also includes the network device 424 that is also described in relation to FIG. 4.

In certain embodiments, in response to a SL grant being received (e.g., either dynamically or semi-persistently) via communications 702 from the network device 424 to the first protocol stack 402, the physical layer 412 of the first protocol stack 402 may convey the SL grant directly to the MAC layer 418 of the second protocol stack 404 via communications 704.

In various embodiments, if an UL grant is received by the remote unit 102, the remote unit 102 may include one or more BSR MAC CEs to report BOs and/or BSRs for UL data, LTE V2X data, and/or NR V2X data. In some embodiments, the UL data BOs and/or BSRs are reported if the UL grant can accommodate all pending UL data BOs and/or BSRs available for transmission including the BSR MAC CEs corresponding to the UL data BOs and/or BSRs.

In certain embodiments, if a SL grant is received by the remote unit 102, the remote unit 102 may cancel all pending sidelink V2X BSRs if the SL grant can accommodate all pending data available for transmission from SL V2X logical channels. In such embodiments, other non-SL V2X BSRs may be considered triggered and are not canceled (e.g., if the network provided resources only for sidelink communication on the second RAT (using an RNTI configured for this purpose in a DCI configured for this purpose) and no resources for UL (data or UL BSR) transmission is available then the BSR triggers for UL are considered as active and are therefore not cancelled).

In various embodiments, the remote unit 102 may perform a BO prioritization if an UL grant is inadequate to carry a complete BSR. In such embodiments, the UL grant may be addressed to C-RNTI, SL V-RNTI, or SL semi-persistent scheduling V-RNTI. The inadequacy may occur because: there are multiple BSR MAC CEs (e.g., one for each of UL data, SL data on LTE, and SL data on NR) available for transmission; there are separate BSR MAC CEs defined for each type of transmission and data is available for transmission corresponding to multiple types of transmission; or a size of BSR MAC CEs for sidelink V2X (e.g., combined for LTE and NR V2X sidelink) exceeds the grant size.

Prioritization, in certain embodiments, may be based on a logical channel priority, PPPP, PPPR, and/or 5QI assigned to bearers. In some embodiments, BOs in BSR MAC CEs may be reported in a decreasing priority order until a remaining size of an UL grant cannot accommodate the next BO.

In some embodiments, a V2X bearer from a first RAT may have a different QoS parameter compared to a V2X bearer from a second RAT. In such embodiments, a mapping table between logical channel priority, PPPP, PPPR, and/or 5QI may be determined and/or used. The mapping table may set an equivalence between different quality values (or value ranges). For example, the mapping table may indicate that PPPP-x=range [5QI-a to 5QI-b]. In certain embodiments, the mapping table may be specified, preconfigured in the remote unit 102, configured by higher layers (e.g., V2X), and/or configured by the network device 424 by higher layers or RRC signaling.

In various embodiments, BOs reporting SL V2X on LTE may be prioritized over other BOs because such BOs may carry basic safety messages. In some embodiments, BOs reporting SL V2X on NR may be prioritized over other BOs because such BOs may carry advanced V2X messages. Prioritized BOs may be configured by the higher layers (e.g., V2X), and/or configured by the network device 424 by higher layers or RRC signaling.

In some embodiments, an existing "Sidelink BSR MAC Control Element" may be used without considering a logical channel priority, PPPP, PPR, and/or 5QI. In such embodiments, depending on the grant size, up to 8 BOs in NR (or 4 BOs in LTE) may be signaled and if there are additional BOs the remote unit 102 may indicate with another bit that there are additional BOs.

Figure 8:
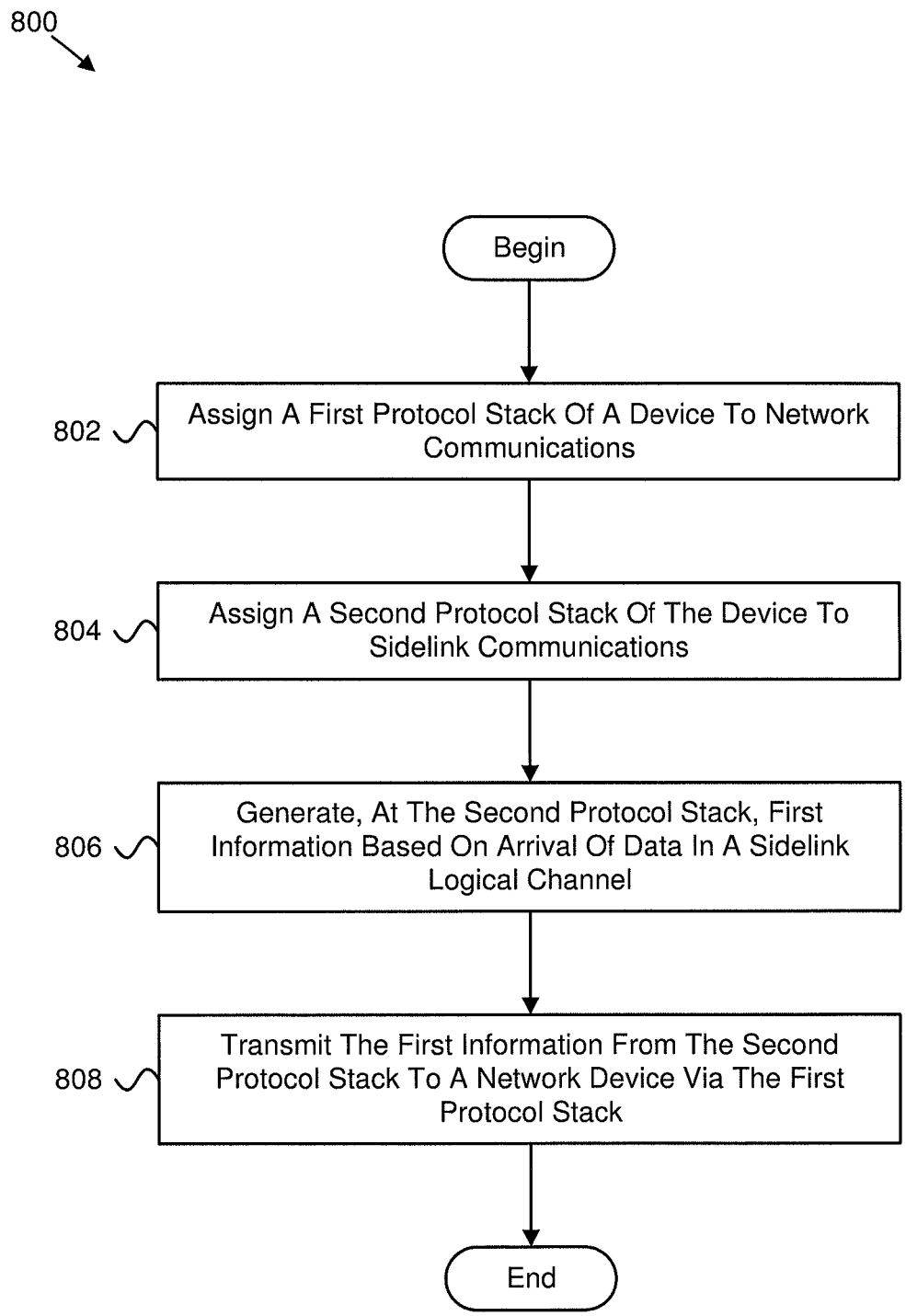
FIG. 8 is a schematic flow chart diagram illustrating one embodiment of a method for sidelink communication using multiple protocol stacks.

FIG. 8 is a schematic flow chart diagram illustrating one embodiment of a method 800 for sidelink communication using multiple protocol stacks. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include assigning 802 a first protocol stack of a device (e.g., remote unit 102) to network communications. In certain embodiments, the method 800 includes assigning 804 a second protocol stack of the device to sidelink communications. In various embodiments, the method 800 includes generating 806, at the second protocol stack, first information based on arrival of data in a sidelink logical channel. In some embodiments, the method 800 includes transmitting 808 the first information from the second protocol stack to a network device (e.g., network unit 104) via the first protocol stack.

In various embodiments, the method 800 further comprises determining that an application is to use the sidelink communications in a non-serving radio access technology, and, in response to determining that the application is to use the sidelink communications in the non-serving radio access technology, the second protocol stack of the device is assigned to the sidelink communications. In some embodiments, determining that the application is to use the sidelink communications comprises determining that the application is to use the sidelink communications based on an indication from an upper layer of the application. In certain embodiments, assigning the second protocol stack of the device to sidelink communications comprises activating the second protocol stack.

In one embodiment, the second protocol stack comprises a physical layer, a medium access control layer, a radio link control layer, a packet data convergence protocol layer, or some combination thereof. In various embodiments, the first protocol stack corresponds to a serving radio access technology and the second protocol stack corresponds to a non-serving radio access technology. In some embodiments, the first information comprises information indicating triggering of a buffer status report.

In certain embodiments, a medium access control layer of the second protocol stack comprises the information indicating the triggering of the buffer status report. In one embodiment, transmitting the first information from the second protocol stack to the network device via the first protocol stack comprises transmitting the first information from the medium access control layer of the second protocol stack to a medium access control layer of the first protocol stack. In various embodiments, the first information comprises an indication that data is available for transmission, a buffer occupancy, a sidelink buffer status report, or some combination thereof.

In some embodiments, in response to the first information comprising the indication that data is available for transmission, the buffer occupancy, or a combination thereof, the first protocol stack prepares a combined buffer status report based on the first information and buffer status report information corresponding to the first protocol stack. In certain embodiments, in response to the first information comprising the sidelink buffer status report, the first protocol stack transmits the sidelink buffer status report to the network device. In one embodiment, the first protocol stack transmits a buffer status report corresponding to the first protocol stack, data, or a combination thereof with the sidelink buffer status report.

In various embodiments, the first information comprises an indication of whether the buffer occupancy corresponds to sideline communications using new radio technology, sidelink communications using long-term evolution technology, uplink data, or some combination thereof. In some embodiments, the indication comprises a first medium access control control element indicating that the buffer occupancy corresponds to sideline communications using new radio technology, a second medium access control control element indicating that the buffer occupancy corresponds to sidelink communications using long-term evolution technology, a third medium access control control element indicating that buffer occupancy corresponds to uplink data, or some combination thereof.

In certain embodiments, the indication comprises a first logical channel group identifier indicating that the buffer occupancy corresponds to sideline communications using new radio technology, a second logical channel group identifier indicating that the buffer occupancy corresponds to sidelink communications using long-term evolution technology, a third logical channel group identifier indicating that buffer occupancy corresponds to uplink data, or some combination thereof.

In one embodiment, the indication comprises a first medium access control control element indicating that the buffer occupancy corresponds to sideline communications using new radio technology, a second medium access control control element indicating that the buffer occupancy corresponds to sidelink communications using long-term evolution technology, a third medium access control control element indicating that buffer occupancy corresponds to uplink data, a first logical channel group identifier indicating that the buffer occupancy corresponds to sideline communications using new radio technology, a second logical channel group identifier indicating that the buffer occupancy corresponds to sidelink communications using long-term evolution technology, a third logical channel group identifier indicating that buffer occupancy corresponds to uplink data, or some combination thereof.

In various embodiments, the method 800 further comprises receiving an uplink grant, and, in response to receiving the uplink grant, transmitting the first information from the second protocol stack to the network device via the first protocol stack. In some embodiments, the method 800 further comprises prioritizing buffer occupancies of the sidelink buffer status report in response to the uplink grant being insufficient to accommodate the buffer occupancies. In certain embodiments, the method 800 further comprises comparing a new radio buffer occupancy to a long-term evolution buffer occupancy using a mapping table.

In one embodiment, the method 800 further comprises transmitting a scheduling request if an uplink grant is unavailable and if the scheduling request is configured for at least one logical channel belonging to the second protocol stack. In various embodiments, the method 800 further comprises, in response to a scheduling request not being configured for the second protocol stack, initiating, via the first protocol stack, a random access procedure. In some embodiments, the random access procedure is initiated by the first protocol stack for the second protocol stack.

In certain embodiments, the method 800 further comprises: receiving, at the first protocol stack, second information from a network device; and transmitting the second information from the first protocol stack to the second protocol stack. In one embodiment, the second information comprises a sidelink grant indicated by a radio network temporary identifier, downlink control information, or a combination thereof.

In one embodiment, a method comprises: assigning a first protocol stack of a device to network communications; assigning a second protocol stack of the device to sidelink communications; generating, at the second protocol stack, first information based on arrival of data in a sidelink logical channel; and transmitting the first information from the second protocol stack to a network device via the first protocol stack.

In various embodiments, the method further comprises determining that an application is to use the sidelink communications in a non-serving radio access technology, and, in response to determining that the application is to use the sidelink communications in the non-serving radio access technology, the second protocol stack of the device is assigned to the sidelink communications.

In some embodiments, determining that the application is to use the sidelink communications comprises determining that the application is to use the sidelink communications based on an indication from an upper layer of the application.

In certain embodiments, assigning the second protocol stack of the device to sidelink communications comprises activating the second protocol stack.

In one embodiment, the second protocol stack comprises a physical layer, a medium access control layer, a radio link control layer, a packet data convergence protocol layer, or some combination thereof.

In various embodiments, the first protocol stack corresponds to a serving radio access technology and the second protocol stack corresponds to a non-serving radio access technology.

In some embodiments, the first information comprises information indicating triggering of a buffer status report.

In certain embodiments, a medium access control layer of the second protocol stack comprises the information indicating the triggering of the buffer status report.

In one embodiment, transmitting the first information from the second protocol stack to the network device via the first protocol stack comprises transmitting the first information from the medium access control layer of the second protocol stack to a medium access control layer of the first protocol stack.

In various embodiments, the first information comprises an indication that data is available for transmission, a buffer occupancy, a sidelink buffer status report, or some combination thereof.

In some embodiments, in response to the first information comprising the indication that data is available for transmission, the buffer occupancy, or a combination thereof, the first protocol stack prepares a combined buffer status report based on the first information and buffer status report information corresponding to the first protocol stack.

In certain embodiments, in response to the first information comprising the sidelink buffer status report, the first protocol stack transmits the sidelink buffer status report to the network device.

In one embodiment, the first protocol stack transmits a buffer status report corresponding to the first protocol stack, data, or a combination thereof with the sidelink buffer status report.

In various embodiments, the first information comprises an indication of whether the buffer occupancy corresponds to sideline communications using new radio technology, sidelink communications using long-term evolution technology, uplink data, or some combination thereof.

In some embodiments, the indication comprises a first medium access control control element indicating that the buffer occupancy corresponds to sideline communications using new radio technology, a second medium access control control element indicating that the buffer occupancy corresponds to sidelink communications using long-term evolution technology, a third medium access control control element indicating that buffer occupancy corresponds to uplink data, or some combination thereof.

In certain embodiments, the indication comprises a first logical channel group identifier indicating that the buffer occupancy corresponds to sideline communications using new radio technology, a second logical channel group identifier indicating that the buffer occupancy corresponds to sidelink communications using long-term evolution technology, a third logical channel group identifier indicating that buffer occupancy corresponds to uplink data, or some combination thereof.

In one embodiment, the indication comprises a first medium access control control element indicating that the buffer occupancy corresponds to sideline communications using new radio technology, a second medium access control control element indicating that the buffer occupancy corresponds to sidelink communications using long-term evolution technology, a third medium access control control element indicating that buffer occupancy corresponds to uplink data, a first logical channel group identifier indicating that the buffer occupancy corresponds to sideline communications using new radio technology, a second logical channel group identifier indicating that the buffer occupancy corresponds to sidelink communications using long-term evolution technology, a third logical channel group identifier indicating that buffer occupancy corresponds to uplink data, or some combination thereof.

In various embodiments, the method further comprises receiving an uplink grant, and, in response to receiving the uplink grant, transmitting the first information from the second protocol stack to the network device via the first protocol stack.

In some embodiments, the method further comprises prioritizing buffer occupancies of the sidelink buffer status report in response to the uplink grant being insufficient to accommodate the buffer occupancies.

In certain embodiments, the method further comprises comparing a new radio buffer occupancy to a long-term evolution buffer occupancy using a mapping table.

In one embodiment, the method further comprises transmitting a scheduling request if an uplink grant is unavailable and if the scheduling request is configured for at least one logical channel belonging to the second protocol stack.

In various embodiments, the method further comprises, in response to a scheduling request not being configured for the second protocol stack, initiating, via the first protocol stack, a random access procedure.

In some embodiments, the random access procedure is initiated by the first protocol stack for the second protocol stack.

In certain embodiments, the method further comprises: receiving, at the first protocol stack, second information from a network device; and transmitting the second information from the first protocol stack to the second protocol stack.

In one embodiment, the second information comprises a sidelink grant indicated by a radio network temporary identifier, downlink control information, or a combination thereof.

In one embodiment, an apparatus comprises: a processor that: assigns a first protocol stack of the apparatus to network communications; assigns a second protocol stack of the apparatus to sidelink communications; and generates, at the second protocol stack, first information based on arrival of data in a sidelink logical channel; and a transmitter that transmits the first information from the second protocol stack to a network device via the first protocol stack.

In various embodiments, the processor determines that an application is to use the sidelink communications in a non-serving radio access technology, and, in response to determining that the application is to use the sidelink communications in the non-serving radio access technology, the processor assigns the second protocol stack of the apparatus to the sidelink communications.

In some embodiments, the processor determines that the application is to use the sidelink communications by determining that the application is to use the sidelink communications based on an indication from an upper layer of the application.

In certain embodiments, the processor assigning the second protocol stack of the apparatus to sidelink communications comprises the processor activating the second protocol stack.

In one embodiment, the second protocol stack comprises a physical layer, a medium access control layer, a radio link control layer, a packet data convergence protocol layer, or some combination thereof.

In various embodiments, the first protocol stack corresponds to a serving radio access technology and the second protocol stack corresponds to a non-serving radio access technology.

In some embodiments, the first information comprises information indicating triggering of a buffer status report.

In certain embodiments, a medium access control layer of the second protocol stack comprises the information indicating the triggering of the buffer status report.

In one embodiment, the transmitter transmitting the first information from the second protocol stack to the network device via the first protocol stack comprises the processor transmitting the first information from the medium access control layer of the second protocol stack to a medium access control layer of the first protocol stack.

In various embodiments, the first information comprises an indication that data is available for transmission, a buffer occupancy, a sidelink buffer status report, or some combination thereof.

In some embodiments, in response to the first information comprising the indication that data is available for transmission, the buffer occupancy, or a combination thereof, the first protocol stack prepares a combined buffer status report based on the first information and buffer status report information corresponding to the first protocol stack.

In certain embodiments, in response to the first information comprising the sidelink buffer status report, the first protocol stack transmits the sidelink buffer status report to the network device.

In one embodiment, the first protocol stack transmits a buffer status report corresponding to the first protocol stack, data, or a combination thereof with the sidelink buffer status report.

In various embodiments, the first information comprises an indication of whether the buffer occupancy corresponds to sideline communications using new radio technology, sidelink communications using long-term evolution technology, uplink data, or some combination thereof.

In some embodiments, the indication comprises a first medium access control control element indicating that the buffer occupancy corresponds to sideline communications using new radio technology, a second medium access control control element indicating that the buffer occupancy corresponds to sidelink communications using long-term evolution technology, a third medium access control control element indicating that buffer occupancy corresponds to uplink data, or some combination thereof.

In certain embodiments, the indication comprises a first logical channel group identifier indicating that the buffer occupancy corresponds to sideline communications using new radio technology, a second logical channel group identifier indicating that the buffer occupancy corresponds to sidelink communications using long-term evolution technology, a third logical channel group identifier indicating that buffer occupancy corresponds to uplink data, or some combination thereof.

In one embodiment, the indication comprises a first medium access control control element indicating that the buffer occupancy corresponds to sideline communications using new radio technology, a second medium access control control element indicating that the buffer occupancy corresponds to sidelink communications using long-term evolution technology, a third medium access control control element indicating that buffer occupancy corresponds to uplink data, a first logical channel group identifier indicating that the buffer occupancy corresponds to sideline communications using new radio technology, a second logical channel group identifier indicating that the buffer occupancy corresponds to sidelink communications using long-term evolution technology, a third logical channel group identifier indicating that buffer occupancy corresponds to uplink data, or some combination thereof.

In various embodiments, the apparatus further comprises a receiver that receives an uplink grant, and, in response to receiving the uplink grant, the transmitter transmits the first information from the second protocol stack to the network device via the first protocol stack.

In some embodiments, the processor prioritizes buffer occupancies of the sidelink buffer status report in response to the uplink grant being insufficient to accommodate the buffer occupancies.

In certain embodiments, the processor compares a new radio buffer occupancy to a long-term evolution buffer occupancy using a mapping table.

In one embodiment, the transmitter transmits a scheduling request if an uplink grant is unavailable and if the scheduling request is configured for at least one logical channel belonging to the second protocol stack.

In various embodiments, the processor, in response to a scheduling request not being configured for the second protocol stack, initiates, via the first protocol stack, a random access procedure.

In some embodiments, the random access procedure is initiated by the first protocol stack for the second protocol stack.

In certain embodiments, the apparatus further comprises a receiver, wherein: the receiver receives, at the first protocol stack, second information from a network device; and the transmitter transmits the second information from the first protocol stack to the second protocol stack.

In one embodiment, the second information comprises a sidelink grant indicated by a radio network temporary identifier, downlink control information, or a combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a user equipment (UE), the method comprising:
 assigning a first protocol stack of the UE to network communications;
 assigning a second protocol stack of the UE to sidelink communications;
 generating, at the second protocol stack, first information based on arrival of data in a sidelink logical channel;
 transmitting the first information within the UE from the second protocol stack to the first protocol stack; and
 transmitting the first information from the first protocol stack to a network device,
 wherein the first information comprises information indicating triggering of a buffer status report,
 wherein a medium access control layer of the second protocol stack comprises the information indicating the triggering of the buffer status report, and
 wherein transmitting the first information form the second protocol stack to the first protocol stack comprises transmitting the first information from the medium access control layer of the second protocol stack directly to a medium access control layer of the first protocol stack.

2. The method of claim 1, further comprising determining that an application is to use the sidelink communications in a non-serving radio access technology, and, in response to determining that the application is to use the sidelink communications in the non-serving radio access technology, the second protocol stack of the device is assigned to the sidelink communications.

3. The method of claim 2, wherein determining that the application is to use the sidelink communications comprises determining that the application is to use the sidelink communications based on an indication from an upper layer of the application.

4. The method of claim 1, wherein assigning the second protocol stack of the device to sidelink communications comprises activating the second protocol stack.

5. The method of claim 1, wherein the second protocol stack comprises a physical layer, a medium access control layer, a radio link control layer, a packet data convergence protocol layer, or some combination thereof.

6. The method of claim 1, wherein the first protocol stack corresponds to a serving radio access technology and the second protocol stack corresponds to a non-serving radio access technology.

7. The method of claim 1, wherein the first information comprises an indication that data is available for transmission, a buffer occupancy, a sidelink buffer status report, or some combination thereof.

8. The method of claim 7, wherein, in response to the first information comprising the indication that data is available for transmission, the buffer occupancy, or a combination thereof, the first protocol stack prepares a combined buffer status report based on the first information and buffer status report information corresponding to the first protocol stack.

9. The method of claim 7, wherein, in response to the first information comprising the sidelink buffer status report, the first protocol stack transmits the sidelink buffer status report to the network device.

10. The method of claim 9, wherein the first protocol stack transmits a buffer status report corresponding to the first protocol stack, data, or a combination thereof with the sidelink buffer status report.

11. The method of claim 7, wherein the first information comprises an indication of whether the buffer occupancy corresponds to sideline communications using new radio technology, sidelink communications using long-term evolution technology, uplink data, or some combination thereof.

12. The method of claim 11, wherein the indication comprises a first medium access control control element indicating that the buffer occupancy corresponds to sideline communications using new radio technology, a second medium access control control element indicating that the buffer occupancy corresponds to sidelink communications using long-term evolution technology, a third medium access control control element indicating that buffer occupancy corresponds to uplink data, or some combination thereof.

13. The method of claim 11, wherein the indication comprises a first logical channel group identifier indicating that the buffer occupancy corresponds to sideline communications using new radio technology, a second logical channel group identifier indicating that the buffer occupancy corresponds to sidelink communications using long-term evolution technology, a third logical channel group identifier indicating that buffer occupancy corresponds to uplink data, or some combination thereof.

14. A user equipment (UE), comprising:
at least one memory; and
at least one processor coupled with the at least one memory and configured to cause the UE to:
assign a first protocol stack of the UE to network communications;
assign a second protocol stack of the UE to sidelink communications;
generate, at the second protocol stack, first information based on arrival of data in a sidelink logical channel;
transmit the first information within the UE from the second protocol stack to the first protocol stack; and
transmit the first information from the first protocol stack to a network device,
wherein the first information comprises information indicating triggering of a buffer status report,
wherein a medium access control layer of the second protocol stack comprises the information indicating the triggering of the buffer status report, and
wherein the processor configured to transmit the first information from the second protocol stack to the first protocol stack comprises the processor configured to transmit the first information from the medium access control layer of the second protocol stack directly to a medium access control layer of the first protocol stack.

15. A method at a user equipment (UE), the method comprising:
receiving, at a first protocol stack of the UE, information from a network device, wherein the first protocol stack is applicable for network communication;
activating a second protocol stack in response to the received information, wherein the second protocol stack is applicable for sidelink communication;
generating first information based on the received information; information;
transmitting the first information within the UE from a medium access control (MAC) layer of the first protocol stack directly to a MAC layer of the second protocol stack; and
transmitting the first information from the second protocol stack of the UE to a second UE via sidelink.

16. The method of claim 15, wherein the information comprises a sidelink grant indicated by a radio network temporary identifier, downlink control information, or a combination thereof.

* * * * *